US010776593B1

(12) United States Patent
Verma et al.

(10) Patent No.: US 10,776,593 B1
(45) Date of Patent: Sep. 15, 2020

(54) AIRLINE BAGGAGE ARRANGEMENT SYSTEM

(71) Applicant: International Business Machines Corporation, Armonk, NY (US)

(72) Inventors: Pramod Verma, Fairfax, VA (US); Rachel Leekin, White Plains, NY (US); Kuntal Dey, Vasant Kunj (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/396,917

(22) Filed: Apr. 29, 2019

(51) Int. Cl.
*G06K 19/00* (2006.01)
*G06K 7/10* (2006.01)
*G06K 19/07* (2006.01)

(52) U.S. Cl.
CPC ..... *G06K 7/10376* (2013.01); *G06K 19/0723* (2013.01)

(58) Field of Classification Search
USPC ....... 235/375, 385, 435, 439, 454, 462, 487, 235/492
See application file for complete search history.

(56) References Cited

U.S. PATENT DOCUMENTS

| 9,315,278 B2 | 4/2016 | Song |
| 9,398,795 B2 | 7/2016 | Gupta |
| 9,736,654 B2 | 8/2017 | Thogersen |
| 9,846,041 B2 | 12/2017 | Silverstein |
| 2002/0040928 A1 | 4/2002 | Jalili |
| 2003/0061085 A1 | 3/2003 | Lanigan |
| 2003/0132842 A1 | 7/2003 | Chia-Yen |
| 2010/0076796 A1 | 3/2010 | Klein |
| 2010/0256805 A1 | 10/2010 | Becker |
| 2010/0300839 A1 | 12/2010 | Glass |
| 2011/0267192 A1 | 11/2011 | Goldman |

(Continued)

FOREIGN PATENT DOCUMENTS

WO 2012066346 A1 5/2012

OTHER PUBLICATIONS

Frey et al., "Optimizing Inbound Baggage Handling at Airports," Transportation Science, vol. 51, No. 4, Nov. 2017, pp. 1210-1225. <https://doi.org/10.1287/trsc.2016.0702>.

(Continued)

*Primary Examiner* — Matthew Mikels
(74) *Attorney, Agent, or Firm* — Jay Wahlquist

(57) ABSTRACT

One example of a computer-implemented method comprises retrieving passenger data of a plurality of passengers on an aircraft, the passenger data including data associating each of the plurality of passengers with a respective luggage; and calculating a respective estimated arrival time for each of the plurality of passengers to arrive at a baggage claim based on movement data associated with a path between an arrival gate and the baggage claim. The method further comprises determining a placement order for placing the respective luggage of each of the plurality of passengers on a baggage claim belt based on the calculated respective estimated arrival time for each of the plurality of passengers; and communicating the placement order to at least one device associated with the respective luggage of each of the plurality of passengers.

16 Claims, 9 Drawing Sheets

(56) References Cited

U.S. PATENT DOCUMENTS

| 2013/0234849 A1* | 9/2013 | Gupta | A45C 13/18 |
| | | | 340/539.11 |
| 2014/0363059 A1* | 12/2014 | Hurewitz | G06Q 30/0201 |
| | | | 382/118 |
| 2015/0029024 A1 | 1/2015 | Outwater | |
| 2016/0080913 A1 | 3/2016 | Thogersen | |
| 2016/0381499 A1 | 12/2016 | Draghici | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AIRLINE BAGGAGE ARRANGEMENT SYSTEM

BACKGROUND

In airport arrivals, baggage (luggage) is typically placed on luggage-belts (baggage claim belt) at random. Thus, it is common that the only ordering done is for the luggage of passengers with priority boarding to be placed ahead of the others. As such, the order of luggage arrivals at the point of luggage collection is also typically random within the class (e.g. random within the priority boarding class, random within normal class, etc.). As a result, lots of luggage can be placed on belts, at times with no space to place the remaining luggage. This can result in increased waiting time for passengers waiting to retrieve their luggage.

SUMMARY

Aspects of the disclosure may include a computer implemented method, computer program product, and system for arranging airline baggage. One example of the computer-implemented method comprises retrieving passenger data of a plurality of passengers on an aircraft, the passenger data including data associating each of the plurality of passengers with a respective luggage; and calculating a respective estimated arrival time for each of the plurality of passengers to arrive at a baggage claim based on movement data associated with a path between an arrival gate and the baggage claim. The method further comprises determining a placement order for placing the respective luggage of each of the plurality of passengers on a baggage claim belt based on the calculated respective estimated arrival time for each of the plurality of passengers; and communicating the placement order to at least one device associated with the respective luggage of each of the plurality of passengers.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
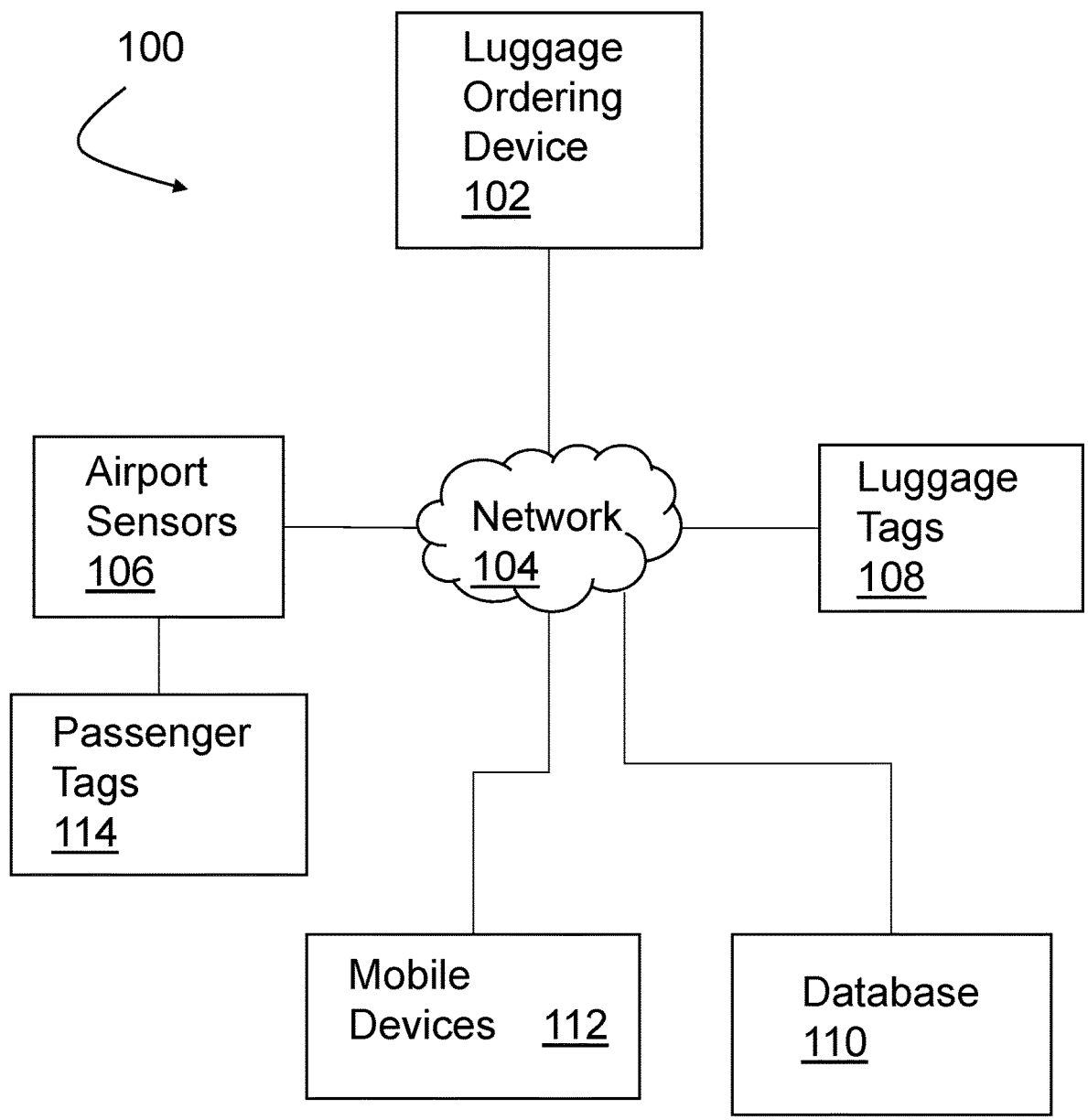
FIG. 1 is a high-level block diagram depicting illustrative elements of one embodiment of an example system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made.

Furthermore, the method presented in the drawing figures and the specification is not to be construed as limiting the order in which the individual steps may be performed. The following detailed description is, therefore, not to be taken in a limiting sense.

The embodiments described below enable a system to estimate different arrival times at a baggage claim for different passengers disembarking from an aircraft. In particular, the present disclosure discusses various embodiments which enable a system and associated methods to reorder luggage intelligently on airport arrival baggage claim belts. For example, various embodiments utilize an engine that dynamically assists airport baggage placement systems (or humans placing luggage) placing baggage on the belts to place in the order of potential arrival of the corresponding passengers to the baggage claim belts. As used herein, the terms luggage and baggage can be used interchangeably. Similarly, as used herein, a passenger can also be referred to as an individual.

FIG. 1 is a high-level block diagram depicting illustrative elements of one embodiment of an example system 100. The system 100 includes a luggage ordering device 102, a plurality of airport sensors 106, and a plurality of luggage tags 108. The luggage ordering device 102 is connected to the plurality of airport sensors 106 and luggage tags 108 via network 104. In addition, the luggage ordering device is connected to a passenger database 110 and one or more passenger mobile devices 112 via network 104 in this embodiment. As used herein, the term mobile device can refer to any portable device such as, but not limited to, a smart phone, tablet, wearable device, etc.

The network 104 can be implemented using any number of any suitable physical and/or logical communications topologies. The network 104 can include one or more private or public computing networks. For example, network 104 may comprise a private network (e.g., a network with a firewall that blocks non-authorized external access) that is associated with the workload. Alternatively, or additionally, network 104 may comprise a public network, such as the Internet. Thus, network 104 may form part of a packet-based network, such as a local area network, a wide-area network, and/or a global network such as the Internet. Network 104 can include one or more servers, networks, or databases, and can use one or more communication protocols to transfer data between luggage ordering device 102 and airport sensors 106, mobile devices 112, luggage tags 108, and database 110. Furthermore, although illustrated in FIG. 1 as a single entity, in other examples network 104 may comprise a plurality of networks, such as a combination of public and/or private networks. The communications network 104 can include a variety of types of physical communication channels or "links." The links can be wired, wireless, optical, and/or any other suitable media. In addition, the communications network 104 can include a variety of network hardware and software for performing routing, switching, and other functions, such as routers, switches, base stations, bridges or any other equipment that may be useful to facilitate communicating data. Furthermore, it is to be understood that although airport sensors 106, luggage tags 108, mobile devices 112, and database 110 are depicted in the example of FIG. 1 as being communicatively coupled to the luggage ordering device 102 via the same network 104, for purposes of illustration, the airport sensors 106, luggage tags 108, mobile devices 112 and database 110 can be coupled to the luggage ordering device 102 via separate networks, in other embodiments. For example, in some embodiments, mobile devices 112 can be communicatively coupled to the luggage ordering device 102 via a cellular network while the airport sensors 106 are communicatively coupled to the luggage ordering device 102 via a local area network.

The airport sensors 106 can be implemented using a variety of sensor types configured to collect data related to determining movement of individuals (also referred to herein as passengers) through the airport. For example, in some embodiments, the plurality of airport sensors 106 includes one or more cameras configured to capture a plurality of images or video. The captured images and video can be analyzed to determine an estimated amount of time for an individual to traverse a predetermined section of the airport. For example, the images or video can be analyzed to determine movement speed of a crowd, length of lines, etc. The analyzed data can be used to estimate the amount of time it will take an individual to traverse the predetermined section of the airport. The captured images and video are communicated to the luggage ordering device 102 for such analysis, in some embodiments. In other embodiments, the analysis is performed by the airport sensors 106 or a device communicatively coupled to the airport sensors 106 and the results of such analysis are communicated to the luggage ordering device 102 via network 104.

Additionally, in some embodiments, the plurality of airport sensors 106 includes one or more checkpoint devices which are configured to enable an individual to "check in" at the respective checkpoint device. An individual can check in at a checkpoint device, in some embodiments, via a mobile device 112. For example, using an application on the individual's mobile device 112 and a Near-Field Communication (NFC) protocol, the individual can pass information to the checkpoint scanner identifying the individual. Alternatively, other wireless technologies, such as, but not limited to, Bluetooth® technology developed and maintained by Bluetooth SIG, Inc., can be used to identify an individual at a checkpoint device. In other embodiments, each checkpoint device may include a user input interface, such as a keyboard or touchscreen display, to enable an individual to check in at the checkpoint device without the use of a mobile device 112. Additionally, in some embodiments, a user can display a code, such as a one-dimensional or two-dimensional barcode on a screen of the individual's mobile device 112 which can be scanned at checkpoint devices in the airport to identify a location of the individual. Alternatively, in some embodiments, the passenger can scan a boarding pass or luggage claim ticket at the checkpoint devices to identify a location of the passenger.

Data indicating individuals that have been identified at a checkpoint device is transmitted to the luggage ordering device 102 via the network 104. Since, the checkpoint devices are located at specific, pre-determined locations, the luggage ordering device can use such information to calculate an estimate of when the individual will arrive at the baggage claim. For example, the information retrieved from the checkpoint devices can be used to track the location of the user through the airport, determine an estimated travel speed of the individual (e.g. based on time elapsed between checking in at different checkpoint devices), and an estimated distance to the baggage claim.

In other embodiments, devices other than or in addition to an individual's mobile device 112 are used at checkpoint devices to identify the individual at specific locations. For example, in some such embodiments, an individual is provided with a radio frequency identification (RFID) passenger tag 114 which is configured to communicate with checkpoint devices in the airport. In some such embodiments, and the RFID tags are passive and the checkpoint devices include an RFID reader which transmits interrogating radio waves used by the RFID tags to collect energy and respond to the interrogating radio wave signals with an identification. In other embodiments, the RFID tags are active tags having their own power supply to transmit signals with an identification. In some embodiments, the RFID tags can be embedded in a luggage claim ticket or a boarding pass provided to the individual when checking the luggage before a flight.

Additionally, in some embodiments, an individual's mobile device 112 can be used to identify a location of the individual either in addition to or in lieu of communicating with airport sensors 106. For example, in some embodiments, location services, such as, but not limited to, location services utilizing Global Positioning System (GPS) or Wi-Fi Positioning System (WPS), are enabled on the individual's mobile device. The location of the mobile device determined from the mobile device's location services can be communicated to the luggage ordering system via the network 104.

It is to be understood that the above sensors and techniques for identifying an individual's location in an airport are provided by way of example only and are not to be taken in a limiting sense. For example, in some embodiments, only one of the types of sensors and/or techniques described above are used. In other embodiments, combinations of the types of sensors and/or techniques described above are used to identify the location of an individual. In yet other embodiments, other techniques and devices not described above can be used in addition to or in lieu of those described above to provide location information for an individual to the luggage ordering device 102. Thus, various embodiments enable tracking a current location of the passengers, such as, but not limited to, via a mobile application installed on the passengers' cellphones, via active boarding passes, via establishing passenger checkpoints where the passengers can swipe their boarding passes to actively indicate locations, etc.

In the embodiment shown in FIG. 1, the luggage ordering device 102 is also communicatively coupled with database 110 via network 104. The database 110 includes information which can be used by the luggage ordering device to calculate an estimate of the arrival time of different passengers to the baggage claim. For example, in some embodiments, the information stored in the database 110 includes, but is not limited to, a map of the airport, locations of airport sensors 106, and passenger information. The passenger information can include information such as, but not limited to, a flight number for a passenger, a gate number of the flight, a baggage identification number associating the passenger with his/her luggage. The passenger information can also include, in some embodiments, information such as the originating airport, nationality of the passenger, etc. which can be used to determine if the passenger needs to pass through an immigration area, for example, prior to arriving at the baggage claim. It is to be understood that in some embodiments, all or part of the information described above as being stored in database 110 can be stored in the luggage ordering device 102 or a storage device co-located with the luggage ordering device 102, in other embodiments. Thus, in some embodiments, the database 110 can be omitted.

The luggage ordering device 102 is configured to receive the data regarding locations of a plurality of passengers/individuals traveling from an arrival gate to the corresponding baggage claim. Based on the received data, the luggage ordering device 102 is configured to calculate an estimated arrival time of each of the plurality of passengers/individuals at the baggage claim. The luggage ordering device 102 is further configured to determine an order of arrival of the plurality of passengers based on the respective estimated arrival time of each of the passengers and to communicate the determined order to the luggage tags 108.

For example, in some embodiments, each luggage tag 108 can be implemented as a sticker (e.g. a sticker commonly placed on flight luggage bag) that is accompanied with a removable tag associated with a Light Emitting Diode (LED) display or other display. Alternatively, the luggage tags 108 can include a tag with a display on the luggage sticker in lieu of having a separate tag. Embodiments of the luggage ordering device 102 also estimate functions that each passenger needs to complete before arriving at the luggage claim belt (such as immigration checkpoints, walking to the luggage collection belt, etc.) as described above. Additionally, embodiments of the luggage ordering device 102 estimate the time the passengers need to complete each estimated action to be taken before arriving at the baggage claim belt.

In some embodiments, the luggage ordering device 102 gives passengers a respective rank based on the expected arrival time at the baggage claim belt. For example, passengers that are expected to arrive earlier can be given a higher rank. The ordering of the corresponding luggage can then be based on the assigned rank. For example, in some embodiments, signals are sent to each luggage tag 108 with the corresponding rank of the passenger to which the tag belongs. The signals can be transmitted via a wireless network. For example, the signals can be transmitted via a Wi-Fi network, cellular network, ZigBee network, etc. The tags 108 with the display can provide a visual indication of the rank by displaying a color or number, for example, associated with the assigned rank. When the luggage is then placed on the baggage claim belt, either manually or automatically, such placement is based on the corresponding visual indication of rank/order on the display.

Additionally, the movement speed of each passenger is detected in some embodiments, such as, but not limited to, via continuous app tracking, radio frequency (RF)-enabled active pass, and/or via the passenger showing/flashing at multiple active checkpoints, as discussed above. Also, as discussed above, the crowd at each movement zone is approximated (as a combination of the number of passengers located at the zone, and/or computer vision modules detecting crowd levels, and/or other crowd level detection modules). The luggage ordering device 102 can scale the movement speed of each passenger as a function of the movement zone and the crowd at that zone, in some embodiments. In some such embodiments, the luggage ordering device 102 can then calculate a movement time of the passenger using the movement speed of the passenger, and the target (destination) of the movement process (i.e. the baggage claim belt). For example, in the case where the trajectory of the passenger is expected via an immigration queue (such as, if the passenger is arriving from an international area) or any other restricted area, then the approximate wait time of the passenger is computed (for example, by using data such as location/movement of other passengers around that time, and/or using computer vision modules, etc.). The total estimated time for the given passenger to reach the baggage claim belt is calculated as the sum of movement time and wait time. By performing these calculations for each passenger on a given flight, the passengers can be ranked based on the estimated arrival time of each passenger. Across passengers, this total time is sorted, and the baggage of the passengers with a lower total time is given precedence. In some embodiments, additional factors, such as class of travel are included in the rank calculation. For example, a passenger A which is estimated to arrive after a passenger B can still be ranked higher than passenger B if passenger A is traveling within a higher priority class of travel.

Figure 2:
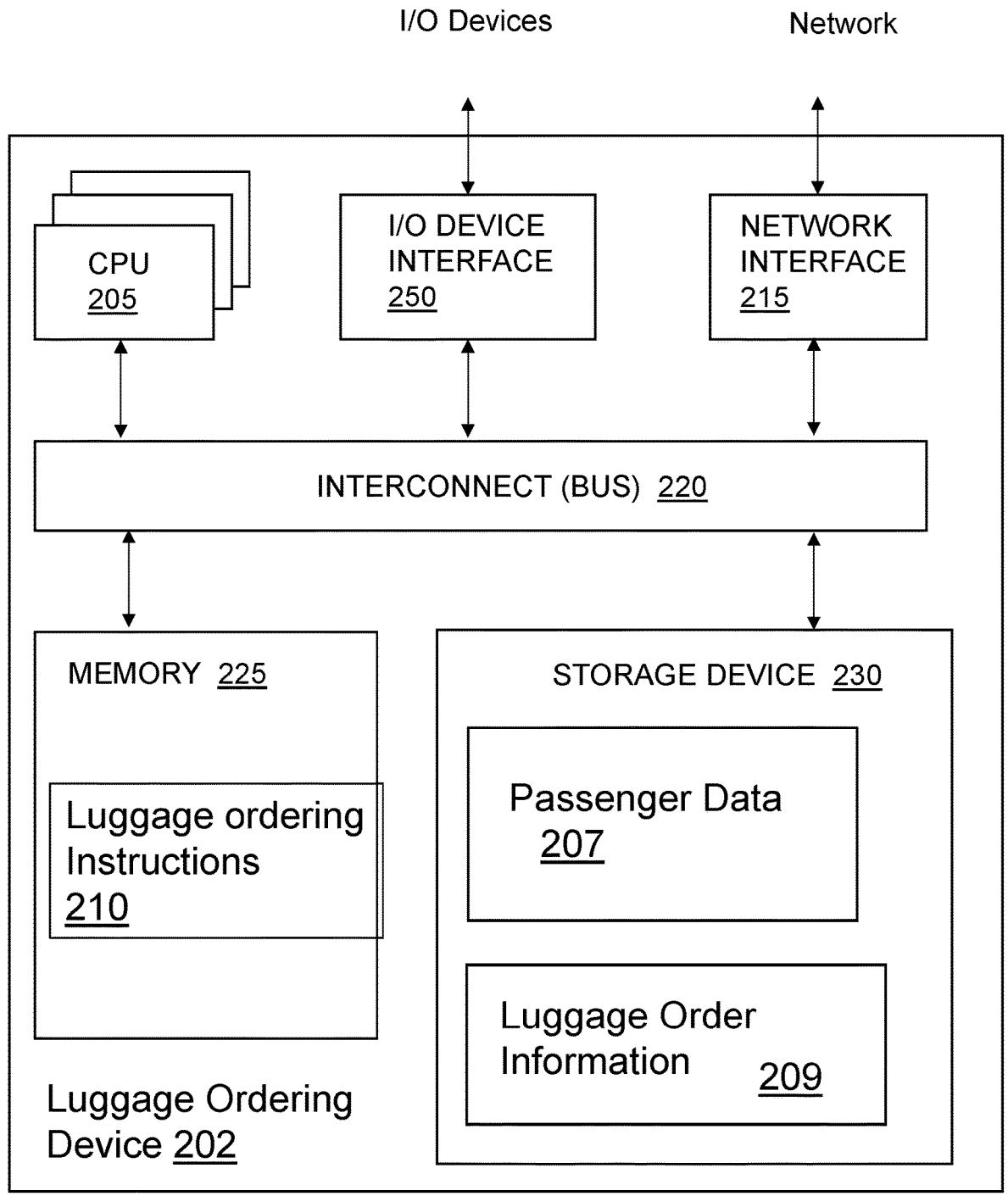
FIG. 2 is a block diagram of one embodiment of an example luggage ordering device.

An example luggage ordering device 102 is described in more detail with respect to FIG. 2. The luggage ordering device 102 is configured to communicate signals to luggage tags 108 via the network 104. The signals are based on the determined order of arrival of the plurality of passengers. Each of the luggage tags 108 are affixed to a piece of luggage and are configured to display or otherwise output an indication of the order in which the luggage should be placed on the baggage claim belt. Examples of luggage tags 108 are described in more detail below with respect to FIGS. 3 and 4.

Thus, the luggage can be placed on the baggage claim belt, either automatically or manually by baggage handlers, in the order indicated by the display on the luggage tags 108 affixed to the various pieces of luggage. Since the luggage ordering device 102 is enabled to calculate an estimated arrival time of the different passengers to the baggage claim, the luggage is ordered on the baggage claim belt in an order approximating the order in which the passengers arrive at the baggage claim. As a result, the baggage is ordered more efficiently reducing wait times for passengers and congestion at the baggage claim.

FIG. 2 is a block diagram of one embodiment of an example luggage ordering device 202. In the example shown in FIG. 2, the luggage ordering device 202 includes a memory 225, storage 230, an interconnect (e.g., BUS) 220, one or more processors 205 (also referred to as CPU 205 herein), an I/O device interface 210, I/O devices 212, and a network interface 215. It is to be understood that the luggage ordering device 202 is provided by way of example only and that the luggage ordering device can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, I/O device interface 250, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the calendar server 202 via the I/O device interface 250 or via a communication network coupled to the network interface 215.

In some embodiments, the memory 225 stores luggage ordering instructions 210 and the storage 230 stores passenger data 207 and luggage order information 209. However, in various embodiments, the luggage ordering instructions 210, the passenger data 207, and the luggage order information 209 are stored partially in memory 225 and partially in storage 230, or they are stored entirely in memory 225 or entirely in storage 230, or they are accessed over a network via the network interface 215. As discussed above, the passenger data 207 can include data regarding a user's flight, seat number, origination airport, nationality, etc. which are used to estimate a path to be taken and amount of time for the user to arrive at the baggage claim. Additionally, as discussed above, the passenger data 207 can be stored in a database or memory device accessed via the network interface 215 rather than being locally attached or integrated with the luggage ordering device 202.

The luggage ordering device 202 tracks the location of one or more passengers of a flight that are traveling from the arrival gate to a luggage claim belt. The luggage ordering device 202 tracks the location of the passengers based on data received from one or more sources, such as airport sensors, passengers' mobile devices, etc., as described above. For example, the luggage ordering device 202 can receive information regarding the location of the one or more passengers via the network interface 215. The luggage ordering instructions 210 are executed by the CPU 205. When executed, the luggage ordering instructions 210 cause the CPU 205 to analyze the data received over the network interface 215 in order to estimate an approximate arrival time for each of the one or more passengers. The luggage ordering instructions 210 are further configured to cause the CPU 205 to calculate an order for placing the luggage on the luggage claim belt based on the estimated arrival times for the one or more passengers. The calculated order of the luggage is saved as luggage order information 209 in storage device 230 in some embodiments. The luggage ordering instructions 210 further cause the CPU 205 to output signals and commands to luggage tags, such as luggage tags 108 in FIG. 1, via network interface 215. The output signals and commands contain information related to the calculated order such that the luggage tags can display information related to the calculated order.

Further details regarding the operation of the luggage ordering device 202 are discussed in more detail below with respect to FIG. 7. In addition, further details regarding example luggage tags are discussed with respect to the example luggage tags depicted in FIGS. 3 and 4. In addition, in some embodiments, the luggage ordering device 202 can be implemented within a cloud computer system or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

Figure 3:
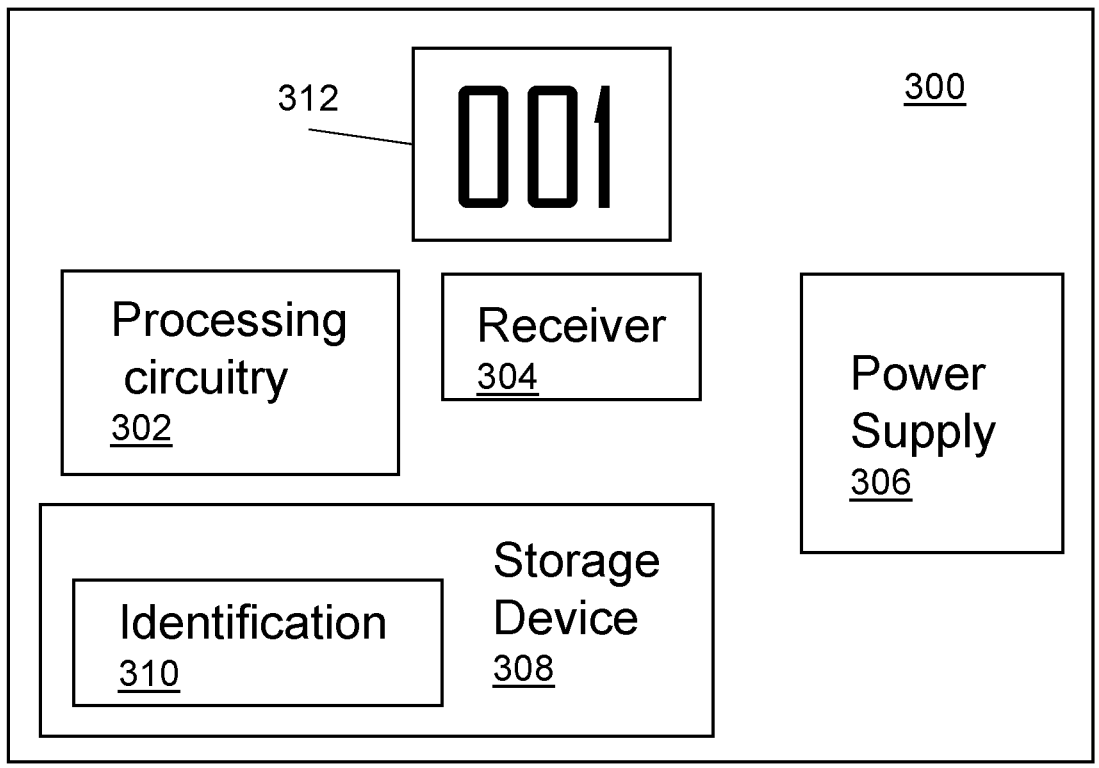
FIG. 3 is a block diagram depicting one embodiment of an example luggage tag.

FIG. 3 is a block diagram depicting one embodiment of an example luggage tag 300. The example luggage tag 300 includes processing circuitry 302, receiver 304, power supply 306, storage device 308, and display 312. The receiver 304 can be implemented as an antenna configured to received wireless radio frequency (RF) signals. The wireless signals can be configured according to a predetermined protocol, such as, but not limited to near field communications (NFC), Wi-Fi/IEEE 802.11, Bluetooth/IEEE 802.15, or infrared. The processing circuitry 302 is configured to process the received wireless signals.

For example, in some embodiments, the wireless signals can be a request for the luggage tag 300 to provide an identification number 310 stored on storage device 308. In response to the request, the processing circuitry 302 can direct the transmitter/receiver 304 to send the requested identification number 310. The transmitter/receiver 304 can then receive a subsequent signal with an indication of the order number for the luggage to which the luggage tag 300 is affixed. The processing circuitry 302 can direct the display 312 to display the number based on the received subsequent signal. In some embodiments, the number indicates a specific order in which to place the luggage on the luggage claim belt, such as 1st in line, 2nd in line, 3rd in line, etc. In other embodiments, the number indicates a grouping. For example, the passengers can be grouped into one of a plurality of groups based on the estimated arrival time of the corresponding passengers. Thus, luggage of passengers in the first group will be placed on the luggage claim belt prior to luggage of passengers in the second group. However, the specific order of placements within a group are not determined or indicated by the number in such embodiments.

In other embodiments, the received signal can include data indicating respective order numbers for corresponding luggage identification numbers. In such embodiments, the processing circuitry 302 is configured to determine if the received data includes an identification number which matches the identification number 310 stored on storage device 308. Based on determining a match, the processing circuitry 302 outputs signals to the display 312 to display the corresponding order number. The display 312 can be implemented using technologies known to one of skill in the art, such as, but not limited to Liquid Crystal Displays (LCD) or Light Emitting Diodes (LED). The processing circuitry 302 can be implemented using various components, such as, but not limited to, application specific integrated circuits (ASIC), field programmable gate arrays (FPGA), and/or a processor configured to execute processor readable instructions stored on a processor readable medium.

Figure 4:
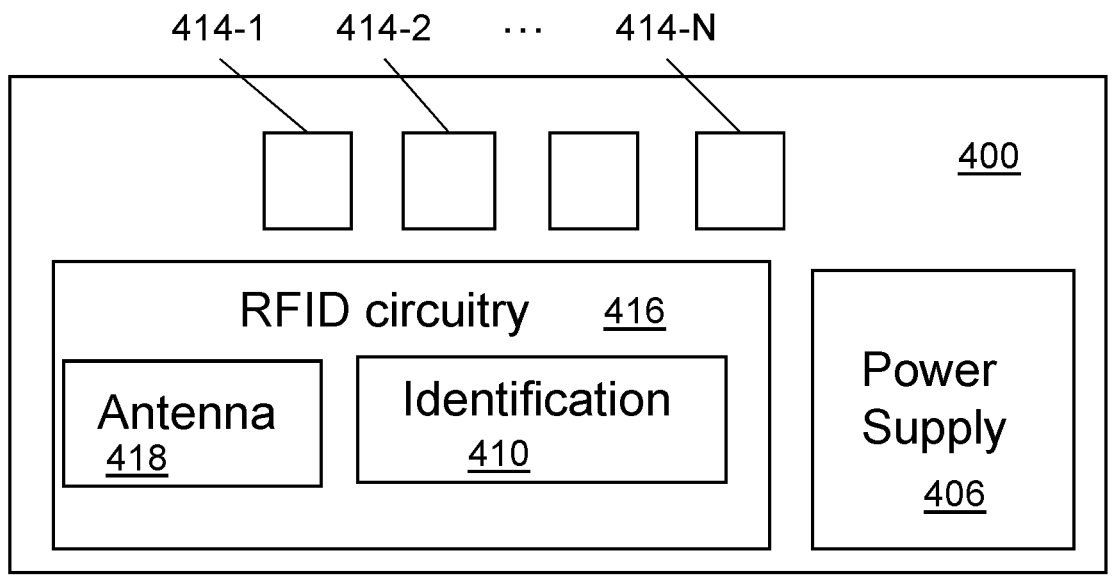
FIG. 4 is a block diagram depicting one embodiment of another example luggage tag.

It is to be understood that the luggage tag 300 is provided by way of example only and that luggage tags capable of indicating an order to be placed on a baggage claim belt can be implemented in other ways in other embodiments. For example, another example luggage tag 400 is depicted in FIG. 4. Luggage tag 400 includes a plurality of LEDs 414-1 . . . 414-N, where N is the total number of LEDs, RFID circuitry 416 and a power supply 406. In this example, LEDs 414-1 . . . 414-N (referred to herein collectively as LEDs 414) are each configured to display a respective different color. Each color represents a different group of passengers. Thus, in this example, rather than indicating a specific placement for luggage of each passenger, the luggage is grouped into 4 different groups based on the estimated arrival time of the corresponding passengers.

In the example of FIG. 4, the RFID circuitry 416 responds to a received signal to select which LED 414 to illuminate. For example, the received signal can indicate an identification number and an assigned group. If the identification number in the received signal matches the identification number 410 in the RFID circuitry 416, then the RFID circuitry directs the corresponding LED 414 to illuminate. The identification number 410 can be hardcoded into the RFID circuitry 416 using techniques known to one of skill in the art.

Figure 5:
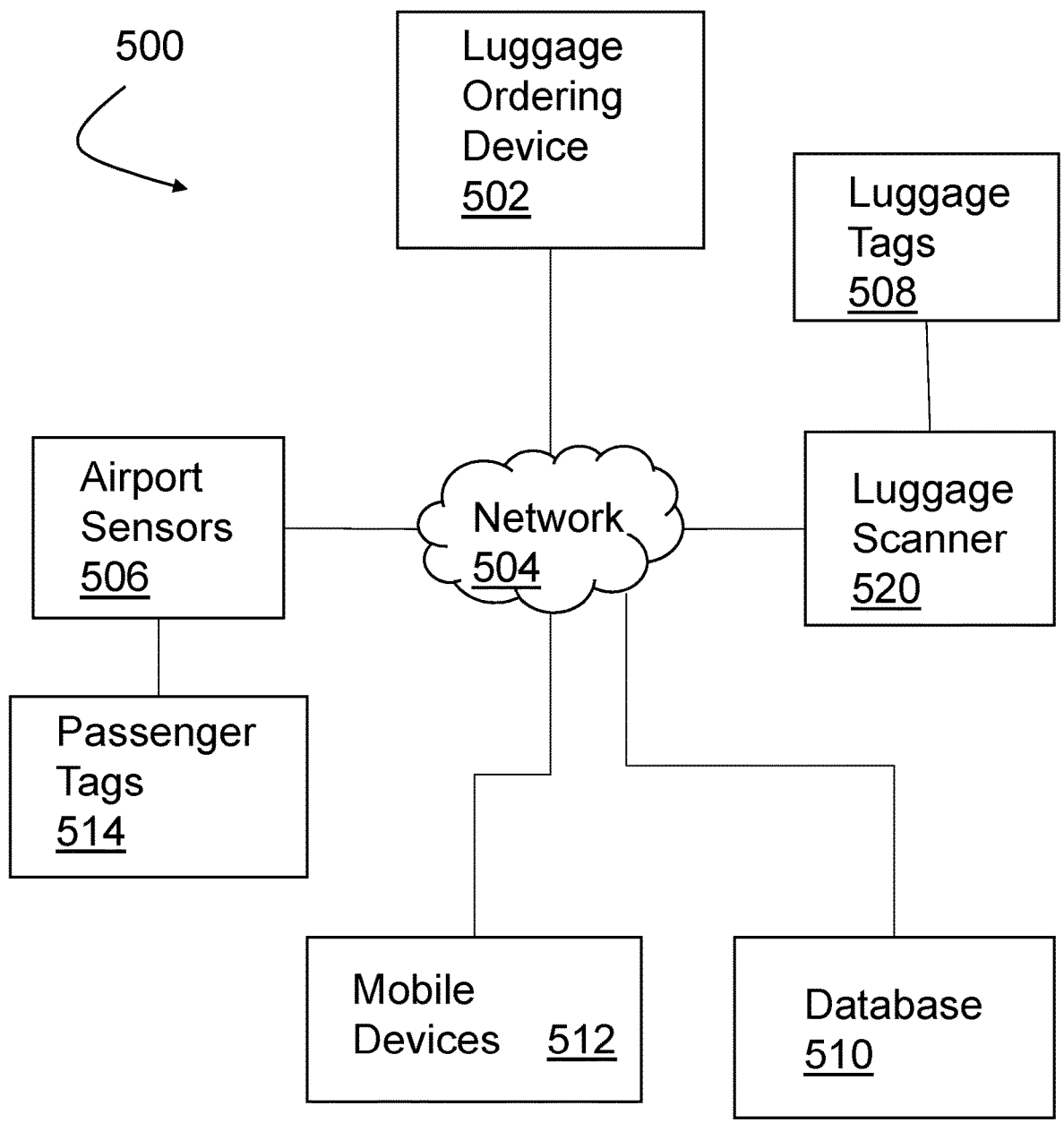
FIG. 5 is a high-level block diagram depicting illustrative elements of one embodiment of another example system.

In both the examples of FIG. 3 and FIG. 4, the luggage tags 300 and 400 include a respective power supply 306 and 406 used to power the display 312, LEDs 414, and other circuitry in the respective tags. However, it is to be understood that in other embodiments, passive tags without a dedicated power supply can be used. For example, FIG. 5 depicts another embodiment of an example system 500 in which passive tags can be used.

The example system 500 is similar to the example system 100 discussed above. In particular, system 500 includes luggage ordering device 502, network 504, airport sensors 506, passenger tags 514, mobile devices 512, and database 510 which are similar in function to the corresponding components discussed above with respect to FIG. 1. In addition, system 500 includes luggage scanner 520 and luggage tags 508. In some embodiments, luggage tags 508 are active tags (e.g. include an integrated power supply), such as luggage tags 300 and 400 discussed above. In other embodiments, the luggage tags 508 are passive tags. For example, in some embodiments, the luggage tags 508 are passive RFID tags which only include RFID circuitry, such as RFID circuitry 416 in FIG. 4, without a power supply, display, or LED indicators.

In some such embodiments, the luggage scanner 520 is configured to send interrogation signals. When the luggage tags 508 are within range of the interrogation signals, each luggage tag 508 responds with a unique identification number. In such embodiments, the luggage scanner 520 receives luggage ordering information from the luggage ordering device 502 via the network 504. In response to receiving the identification numbers from the luggage tags 508, the luggage scanner 520 is configured to compare the identification numbers to the luggage ordering information from the luggage ordering device 502 to determine the placement order for each of corresponding luggage. For example, in some embodiments, the luggage scanner 520 can be a handheld device which displays a number, color or other indication of placement order for a human user such that the human user can place the luggage in the corresponding order on the luggage claim belt. In other embodiments, the luggage scanner 520 can be part of or communicatively coupled to a mechanical system configured to automatically place or route the luggage onto the luggage claim belt in the indicated order. One example embodiment of a luggage scanner is discussed in more detail below with respect to FIG. 6.

Figure 6:
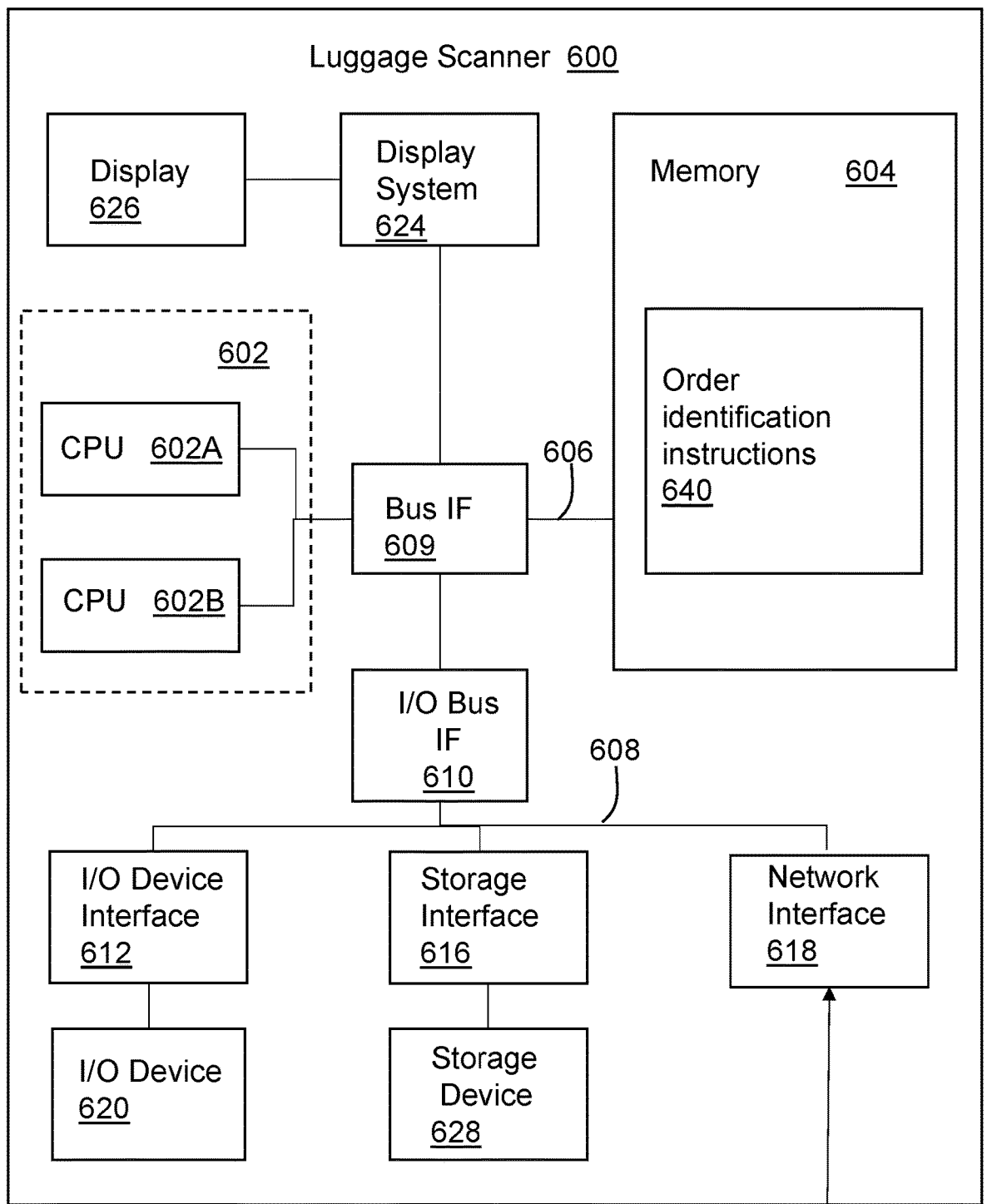
FIG. 6 is a high-level block diagram of one embodiment of an example luggage scanner.

FIG. 6 is a high-level block diagram of one embodiment of an example luggage scanner 600. The components of the luggage scanner 600 shown in FIG. 6 include one or more processors 602, a memory 604, a storage interface 616, an Input/Output ("I/O") device interface 612, and a network interface 618, all of which are communicatively coupled, directly or indirectly, for inter-component communication via a memory bus 606, an I/O bus 608, bus interface unit ("IF") 609, and an I/O bus interface unit 610.

In the embodiment shown in FIG. 6, the luggage scanner 600 also includes one or more general-purpose programmable central processing units (CPUs) 602A and 602B, herein generically referred to as the processor 602. In some embodiments, the luggage scanner 600 contains multiple processors. However, in other embodiments, the luggage scanner 600 is a single CPU system. Each processor 602 executes instructions stored in the memory 604.

In some embodiments, the memory 604 includes a random-access semiconductor memory, storage device, or storage medium (either volatile or non-volatile) for storing or encoding data and programs. For example, the memory 604 stores order identification instructions 640. When executed by a processor such as processor 602, the order identification instructions 640 cause the processor 602 to perform the functions and calculations for comparing received identification numbers from one or more luggage tags with luggage ordering information received from a luggage ordering device. The order identification instructions 640 further cause the processor 602 to output commands to the display system 624 to display an indication of the placement order or group on the display device 626, as described above.

In some embodiments, the memory 604 represents the entire virtual memory of the luggage scanner 600 and may also include the virtual memory of other computer systems coupled directly to the computer system 600 or connected via a network. In some embodiments, the memory 604 is a single monolithic entity, but in other embodiments, the memory 604 includes a hierarchy of caches and other memory devices. For example, the memory 604 can exist in multiple levels of caches, and these caches may be further divided by function, so that one cache holds instructions while another holds non-instruction data, which is used by the processor. The memory 604 may be further distributed and associated with different CPUs or sets of CPUs, as is known in any various so-called non-uniform memory access (NUMA) computer architectures, for example.

Hence, although the order identification instructions 640 are stored on the same memory 604 in the example shown in FIG. 6 for purposes of explanation, it is to be understood that other embodiments can be implemented differently. For example, the order identification instructions 640 can be distributed across multiple physical media.

Furthermore, in some embodiments, the order identification instructions 640 are executed by the same processor 602. However, in other embodiments, execution of the order identification instructions 640 are distributed across multiple processors located in the same or different computer systems. For example, in some such embodiments, at least a portion of the instructions and data structures associated with the order identification instructions 640 can be on different computer systems and accessed remotely, e.g., via the network interface 618. The luggage scanner 600 can use virtual addressing mechanisms that allow the programs of the luggage scanner 600 to behave as if it only has access to a large, single storage entity instead of access to multiple, smaller storage entities. Thus, the memory 604 can store all or a portion of the various programs, modules, and data structures for providing order identification of luggage as described herein.

The luggage scanner 600 in the embodiment shown in FIG. 6 also includes a bus interface unit 609 to handle communications among the processor 602, the memory 604, the display system 624, and the I/O bus interface unit 610. The I/O bus interface unit 610 is coupled with the I/O bus 608 for transferring data to and from the various I/O units. In particular, the I/O bus interface unit 610 can communicate with multiple I/O interface units 612, 616, and 618, which are also known as I/O processors (IOPs) or I/O adapters (IOAs), through the I/O bus 608. The display system 624 includes a display controller, a display memory, or both. The display controller can provide video, audio, or both types of data to a display device 626. The display memory may be a dedicated memory for buffering video data. The display system 624 is coupled with the display device 626, such as a standalone display screen, computer monitor, television, a tablet or handheld device display, or other displayable device. In some embodiments, the display device 626 also includes one or more speakers for rendering audio, such as announcing a placement order (e.g. a specific number or group) for the luggage. Alternatively, one or more speakers for rendering audio may be coupled with an I/O interface unit. In alternate embodiments, one or more functions provided by the display system 624 are on board an integrated circuit that also includes the processor 602. In addition, in some embodiments, one or more of the functions provided by the bus interface unit 609 is on board an integrated circuit that also includes the processor 602.

The I/O interface units support communication with a variety of storage and I/O devices. For example, the I/O device interface unit 612 supports the attachment of one or more user I/O devices 620, which may include user output devices (such as a video display device, speaker, fax machine, printer, and/or television set) and user input devices (such as a keyboard, mouse, keypad, touchpad, trackball, buttons, light pen, or other pointing devices). A user can manipulate the user input devices 620 using a user interface, in order to provide input data and commands to the user I/O device 620 and the luggage scanner 600. Additionally, a user can receive output data via the user output devices. For example, a user interface may be presented via the user I/O device 620, such as displayed on a display device, played via a speaker, or printed via a printer.

The storage interface 616 supports the attachment of one or more disk drives or direct access storage devices 628 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 628 is implemented via any type of secondary storage device. The contents of the memory 604, or any portion thereof, may be stored to and retrieved from the storage device 628 as needed. The network interface 618 provides one or more communication paths from the luggage scanner 600 to other digital devices and computer systems, such as the luggage ordering device discussed above.

Although the luggage scanner 600 shown in FIG. 6 illustrates a particular bus structure providing a direct communication path among the processors 602, the memory 604, the bus interface 609, the display system 624, and the I/O bus interface unit 610, in alternative embodiments the luggage scanner 600 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 610 and the I/O bus 608 are shown as single respective units, the computer system 600, can include multiple I/O bus interface units 610 and/or multiple I/O buses 608 in other embodiments. While multiple I/O interface units are shown, which separate the I/O bus 608 from various communication paths running to the various I/O devices, in other embodiments, some or all of the I/O devices are connected directly to one or more system I/O buses.

In various embodiments, the luggage scanner 600 is a multi-user mainframe computer system, a single-user system, or a server computer or similar device that has little or no direct user interface, but receives requests from other computer systems (clients). In other embodiments, the luggage scanner 600 is implemented as a desktop computer, portable computer, laptop or notebook computer, tablet computer, pocket computer, telephone, smart phone, or any other suitable type of electronic device.

As discussed above, in some embodiments, one or more of the components and data shown in FIG. 6 include instructions or statements that execute on the processor 602 or instructions or statements that are interpreted by instructions or statements that execute the processor 602 to carry out the functions as described herein. In other embodiments, one or more of the components shown in FIG. 6 are implemented in hardware via semiconductor devices, chips, logical gates, circuits, circuit cards, and/or other physical hardware devices in lieu of, or in addition to, a processor-based system. In addition, in other embodiments, some of the components shown in FIG. 6 can be omitted and/or other components can be included. For example, in some embodiments, the display device 626 and display system 624 can be omitted.

Figure 7:
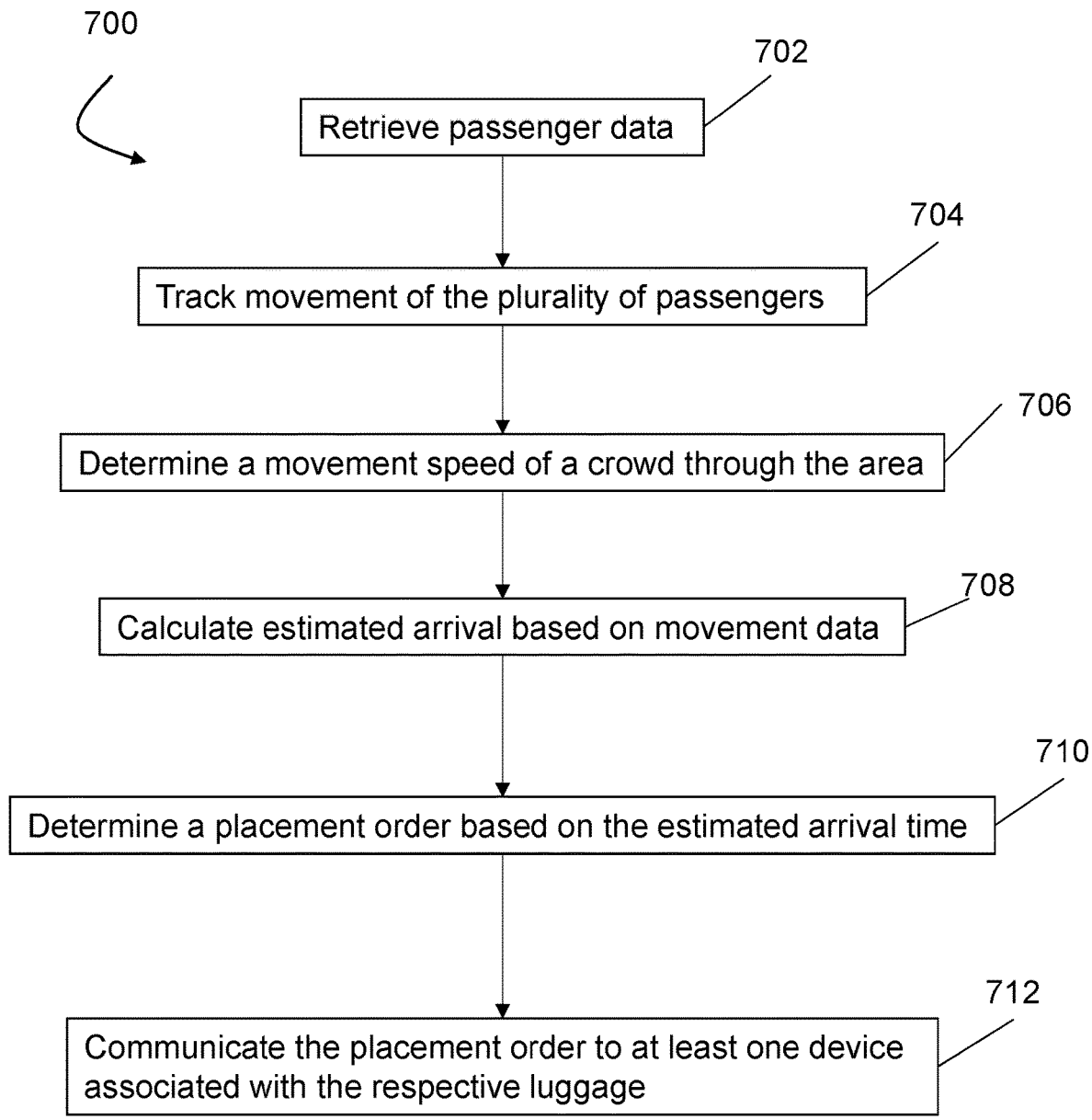
FIG. 7 is a flow chart depicting one embodiment of an example method of dynamically arranging luggage.

FIG. 7 is a flow chart depicting one embodiment of an example method 700 of dynamically arranging luggage. The method 700 can be implemented by a luggage ordering device, such as luggage ordering device 102 or 202 described above. For example, the method 700 can be implemented by a CPU, such as CPU 205 in luggage ordering device 202, executing instructions, such as luggage ordering instructions 210. It is to be understood that the order of actions in example method 700 is provided for purposes of explanation and that the method can be performed in a different order in other embodiments. Similarly, it is to be understood that some actions can be omitted or additional actions can be included in other embodiments.

At block 702, passenger data of a plurality of passengers on an aircraft is retrieved. For example, the passenger data can be retrieved from a database over a network, in some embodiments, as described above. As described above, the passenger data can include data associating each of the plurality of passengers with a respective luggage. For example, the passenger data can include a unique luggage claim number identifying the luggage corresponding to the passenger. Additionally, in some embodiments, other data can be included in the passenger data. For example, in some embodiments, the passenger data includes data regarding a seat assignment of each passenger, origination airport, information regarding an international flight indicating the need to pass through an immigration checkpoint, etc., as described above.

At block 704, movement of the plurality of passengers is tracked as each of the plurality of passengers moves along a path between an arrival gate and the baggage claim. Tracking movement of the plurality of passengers includes, in some embodiments, identifying a location of each of the plurality of passengers based on data received from a plurality of sensors located in the airport. As described above, in some such embodiments, each of the plurality of sensors is configured to communicate with a respective radio frequency identification (RFID) tag carried by each of the plurality of passengers when in range of the respective RFID tag carried by each of the plurality of passengers. For example, the RFID tag can be included in an active boarding pass, luggage claim ticket, or other tag provided to the passenger when checking luggage.

Additionally, in some embodiments, tracking movement of each of the plurality of passengers includes identifying a location of each of the plurality of passengers based on receiving data from a plurality of checkpoint sensors, as discussed above. For example, the checkpoint sensors can be located at known location in the airport and configured to receive input from each respective passenger of the plurality of passengers indicating the location of the respective passenger. In some embodiments, the passengers can scan a code displayed on a mobile device, a boarding pass, or otherwise actively check-in at the checkpoint sensor, as described above. In addition, in some embodiments, tracking movement of each of the plurality of passengers includes receiving location information from a respective mobile device of each of the plurality of passengers, as described above.

At block 706, a movement speed of a crowd through the area is determined. For example, as described above, a plurality of images/video of one or more areas are received from a plurality of cameras located in the airport and analyzed to determine the movement speed of the crowd through the one or more areas.

At block 708, a respective estimated arrival time for each of the plurality of passengers to arrive at the baggage claim is calculated based on movement data. In some embodiments, the movement data includes both the tracked movement of each of the plurality of passengers from block 704 and the movement speed of the crowd through one or more areas determined at block 706. In other embodiments, only the tracked movement of the plurality of passengers or the movement speed of the crowd is used as the movement data in calculating the estimated arrival time.

At block 710, a placement order for placing the respective luggage of each of the plurality of passengers on a baggage claim belt is determined based on the calculated respective estimated arrival time for each of the plurality of passengers, as described above. In some embodiments, determining the placement order includes determining a specific placement number for the luggage of each of the plurality of passengers, as discussed above. In other embodiments, determining the placement order includes selecting one of a plurality of groups for the luggage of each of the plurality of passengers where each group has a priority order for placement on the baggage claim belt, but the order within a group is not specified, as described above. In addition, in some embodiments, the class of travel of each passenger is included in the determination of the placement order for the luggage.

At 712, the placement order is communicated to at least one device associated with the respective luggage of each of the plurality of passengers. For example, as described above, the placement order for each luggage can be communicated to tags affixed to corresponding luggage and configured to display an indication of the placement order of the corresponding luggage, as described above. In other embodiments, the placement order is communicated to a luggage scanner or device, such as luggage scanner 520 or luggage scanner 600. The luggage scanner is configured to scan tags affixed to corresponding luggage and to display an indication of the placement order of the luggage corresponding to the scanned tag, as discussed above.

It is to be understood that method 700 can be executed iteratively, in some embodiments, such that the placement order of luggage which has not yet been placed on a baggage claim belt can be updated as estimated arrival times of the passengers are updated. In other embodiments, the method 700 is executed at a predetermined point in time, such as when the luggage is ready to be placed on the luggage claim belt. The method 700 can aid human luggage handlers to arrange and place the luggage in an order the approximates the order in which the passengers will arrive at a baggage claim belt. In other embodiments, the luggage ordering device which executes method 700 can be implemented into an automated system which places luggage on a baggage claim belt, such that the luggage is automatically arranged in the order determined by the luggage ordering device.

Figure 8:
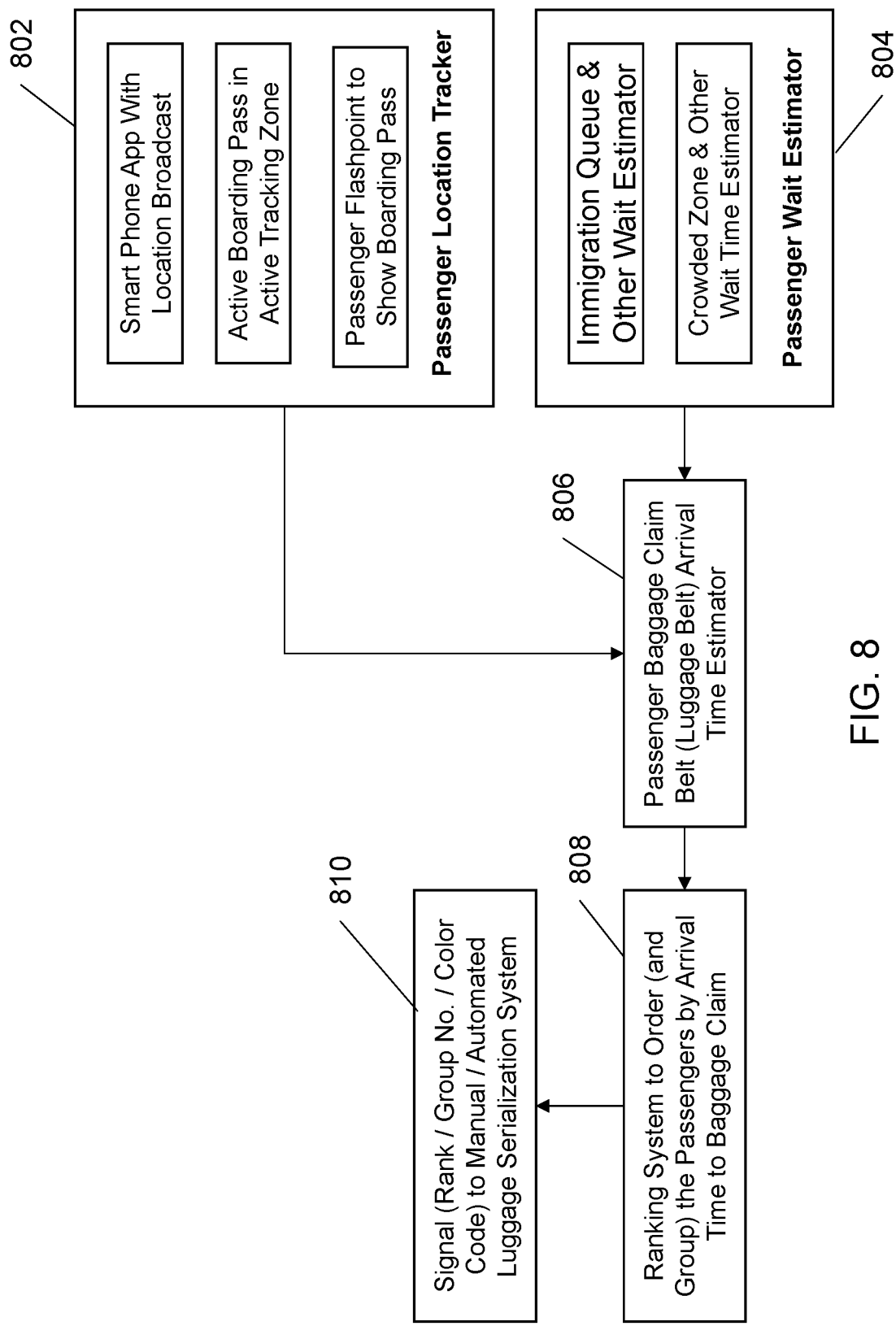
FIG. 8 depicts one example of a process flow diagram which can be implemented by a luggage ordering device.

FIG. 8 depicts one example of a process flow diagram 800 which can be implemented by a luggage ordering device, such as luggage ordering device 202. In particular, a luggage ordering device can implement a passenger location tracker 802 and a passenger wait estimator 804, such as through a processor executing instructions. The passenger location tracker 802 receives various data input from other sensors and devices. For example, as discussed above, the passenger location tracker 802 of the luggage ordering device can receive location data from a smart phone app configured to transmit location, data indicating an active boarding pass is in an active tracking zone from one or more sensors located in the airport, and/or data from sensors (e.g. "flashpoints" or "checkpoints") which enable a passenger to check in (such as by showing a boarding pass). As discussed above, based on the data received, the luggage ordering device tracks the location of the passenger.

Similarly, as discussed above, the passenger wait estimator 804 can receive data regarding an immigration queue, data regarding a crowded zone, and/or data regarding other causes of waiting. For example, as discussed above, such wait estimation can be determined based on analysis of images of an area, in some embodiments. Based on the estimated passenger location and the estimated passenger wait time, the luggage ordering device is configured to compute an estimate time at which the passenger will arrive at the baggage claim (at 806), as discussed above. Additionally, based on the estimated arrival time, the luggage ordering device is configured to implement a ranking system to order and/or group the passengers by arrival time (at 808). For example, as discussed above, in some embodiments, this includes assigning a specific numerical order to each passenger's luggage. In other embodiments, this includes assigning a group number to each passenger's luggage. The luggage ordering device then sends a signal indicating the assigned rank, group number, or color code etc. which represents the computed ordering of the luggage (at 810). The signal can be sent to a manual or automated luggage serialization system, as discussed above. For example, the signal can be sent directly to a tag affixed to each luggage configured to display a respective order or rank, in some embodiments. In other embodiments, the signal is sent to a device configured to scan a tag affixed to each luggage. The device can be handheld by a user for manual ordering of the luggage or a system configured to automatically move and order the luggage for placement on the baggage claim belt, as discussed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
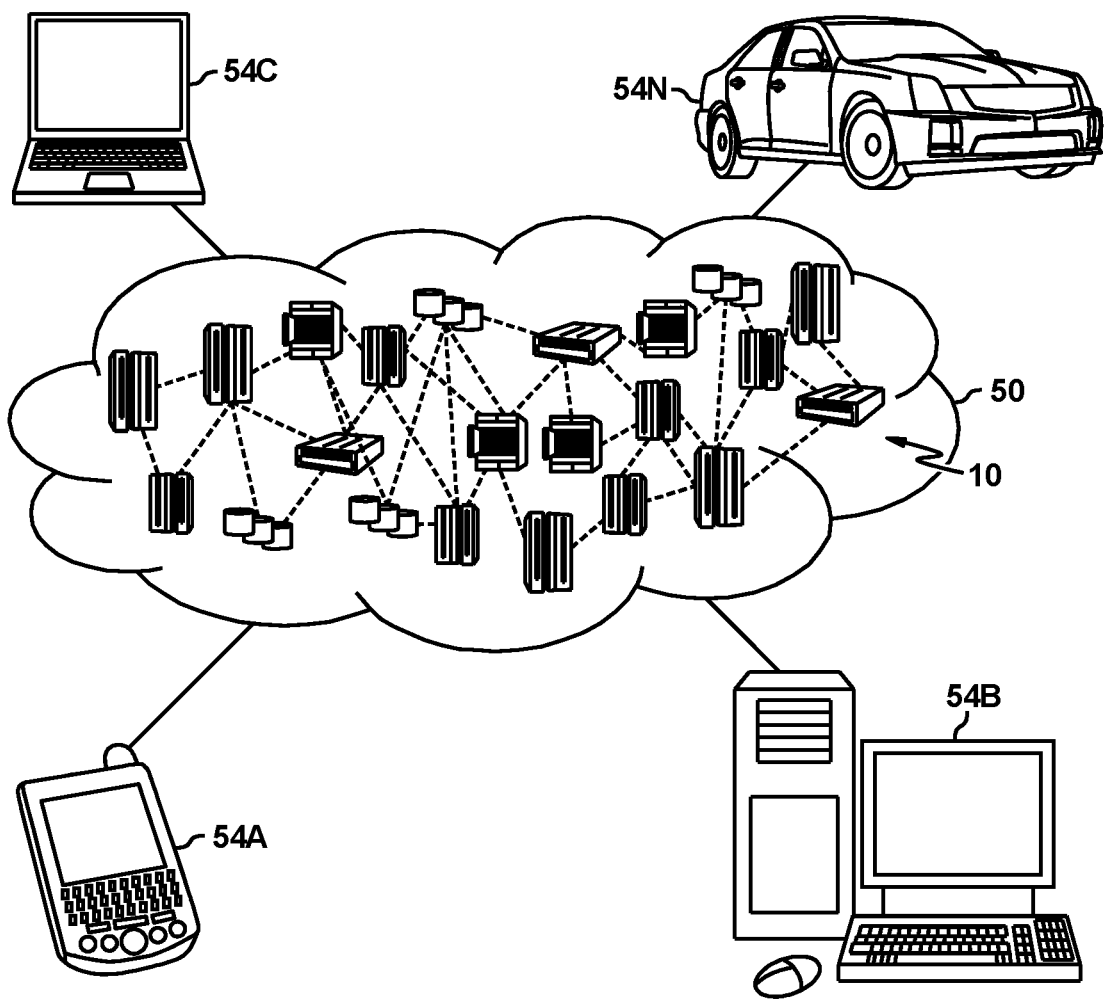
FIG. 9 depicts one embodiment of a cloud computing environment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
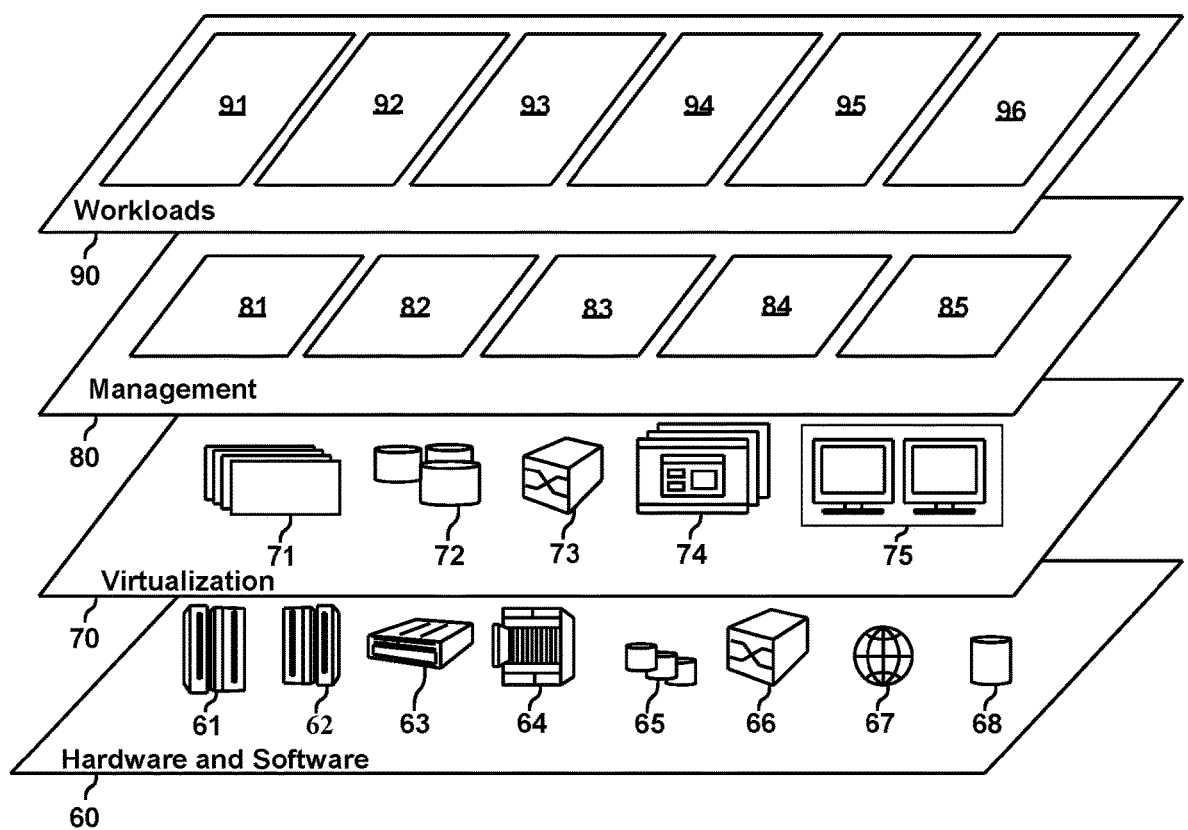
FIG. 10 depicts one embodiment of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and arrival estimating and luggage order determining 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   retrieving passenger data of a plurality of passengers on an aircraft, the passenger data including data associating each of the plurality of passengers with a respective luggage;
   calculating a respective estimated arrival time for each of the plurality of passengers to arrive at a baggage claim based on movement data associated with a path between an arrival gate and the baggage claim;
   determining a placement order for placing the respective luggage of each of the plurality of passengers on a baggage claim belt based on the calculated respective estimated arrival time for each of the plurality of passengers; and
   communicating the placement order to at least one device associated with the respective luggage of each of the plurality of passengers.

2. The method of claim 1, further comprising:
   tracking movement of each of the plurality of passengers as each of the plurality of passengers moves along the path, wherein the movement data includes the tracked movement of each of the plurality of passengers.

3. The method of claim 2, wherein tracking movement of each of the plurality of passengers comprises identifying a location of each of the plurality of passengers based on data received from a plurality of sensors located in the airport, each of the plurality of sensors configured to communicate with a respective radio frequency identification (RFID) tag carried by each of the plurality of passengers when in range of the respective RFID tag carried by each of the plurality of passengers.

4. The method of claim 2, wherein tracking movement of each of the plurality of passengers comprises identifying a location of each of the plurality of passengers based on receiving data from a plurality of checkpoint sensors located at known location in the airport and configured to receive input from each respective passenger of the plurality of passengers indicating the location of the respective passenger.

5. The method of claim 2, wherein tracking movement of each of the plurality of passengers comprises receiving location information from a respective mobile device of each of the plurality of passengers.

6. The method of claim 1, further comprising:
   analyzing images of an area received from a plurality of cameras located in the airport to determine a movement speed of a crowd through the area, the movement data including the movement speed of the crowd through the area.

7. The method of claim 1, wherein calculating the estimated arrival time for each of the plurality of passengers further comprises calculating the estimated arrival time based on the passenger data.

8. The method of claim 1, wherein determining the placement order further comprises determining the placement order based on a respective class of travel for each of the plurality of passengers.

9. The method of claim 1, wherein communicating the placement order to at least one device comprises communicating the placement order to a plurality of tags, each tag affixed to a corresponding luggage and configured to display an indication of the placement order of the corresponding luggage.

10. The method of claim 1, wherein communicating the placement order to at least one device comprises communicating the placement order to a device configured to scan a tag affixed to a corresponding luggage, the device configured to display an indication of the placement order of the luggage corresponding to the scanned tag.

11. The method of claim 1, wherein determining the placement order comprises determining a specific placement number for the luggage of each of the plurality of passengers.

12. The method of claim 1, wherein determining the placement order comprises selecting one of a plurality of groups for the luggage of each of the plurality of passengers, each group having a priority order for placement on the baggage claim belt.

13. A computer program product comprising a computer readable storage medium having a computer readable program stored therein, wherein the computer readable program, when executed by a processor, causes the processor to:
   retrieve passenger data of a plurality of passengers on an aircraft, the passenger data including data associating each of the plurality of passengers with a respective luggage;
   calculate a respective estimated arrival time for each of the plurality of passengers to arrive at a baggage claim based on movement data associated with a path between an arrival gate and the baggage claim;
   determine a placement order for placing the respective luggage of each of the plurality of passengers on a baggage claim belt based on the calculated respective estimated arrival time for each of the plurality of passengers; and
   output, via the network interface, the placement order to at least one device associated with the respective luggage of each of the plurality of passengers.

14. The computer program product of claim 13, wherein the computer readable program is further configured to cause the processor to track movement of each of the plurality of passengers as each of the plurality of passengers moves along the path, wherein the movement data includes the tracked movement of each of the plurality of passengers.

15. The computer program product of claim 13, wherein the computer readable program is further configured to cause the processor to analyze images of an area received from a plurality of cameras located in the airport to determine a movement speed of a crowd through the area, the movement data including the movement speed of the crowd through the area.

16. The computer program product of claim 13, wherein the computer readable program is further configured to cause the processor to output the placement order to a plurality of tags, each tag affixed to a corresponding luggage and configured to display an indication of the placement order of the corresponding luggage.

* * * * *